United States Patent [19]

Brun et al.

[11] Patent Number: 5,399,638

[45] Date of Patent: Mar. 21, 1995

[54] METHOD FOR THE TREATMENT OF A CATALYTIC COMPONENT ON A POROUS METAL OXIDE SUPPORT FOR THE POLYMERIZATION OF OLEFINS IN THE GAS PHASE AND METHOD OF POLYMERIZING OLEFINS

[75] Inventors: Claude Brun, Idron Bizanos; Auguste Cheux, Arthez-de-Bearn; Eric Barthel, Pau, all of France

[73] Assignee: Atochem, France

[21] Appl. No.: 819,182

[22] Filed: Jan. 10, 1992

Related U.S. Application Data

[60] Division of Ser. No. 429,017, Oct. 30, 1989, Pat. No. 5,112,785, which is a continuation of Ser. No. 206,119, Jun. 13, 1988, abandoned.

[30] Foreign Application Priority Data

Jun. 16, 1987 [FR] France ................................ 87 08403

[51] Int. Cl.$^6$ ........................... C08F 2/34; C08F 4/654
[52] U.S. Cl. ...................................... 526/153; 526/151; 526/348.2; 526/348.4; 526/348.5; 526/348.6; 526/352; 526/901; 526/904; 502/108
[58] Field of Search ............... 526/129, 151, 153, 901, 526/904

[56] References Cited

U.S. PATENT DOCUMENTS

| | | | |
|---|---|---|---|
| 4,287,328 | 9/1981 | Kikuta et al. | 526/115 |
| 4,508,844 | 4/1985 | Agapiou | 502/132 |
| 4,558,023 | 12/1985 | Brun et al. | 502/108 |
| 4,579,836 | 4/1986 | Arzoumanidis et al. | 502/133 |
| 4,603,184 | 7/1986 | Sato et al. | 526/142 |
| 4,640,907 | 2/1987 | Best | 526/129 |
| 4,652,540 | 3/1987 | Takahashi et al. | 502/108 |

FOREIGN PATENT DOCUMENTS

| | | |
|---|---|---|
| 133383 | 2/1985 | European Pat. Off. . |
| 174104 | 3/1986 | European Pat. Off. . |

*Primary Examiner*—Joseph L. Schofer
*Assistant Examiner*—D. Wu
*Attorney, Agent, or Firm*—John L. Sigalos

[57] ABSTRACT

The method of forming a catalytic component for use in the polymerization of ethylene or a copolymer of ethylene and a $C_3$ to $C_{12}$ alpha olefin in a gas-phase comprising impregnating a porous metal oxide support with at least one titanium compound, magnesium compound, and chlorine compound, and prepolymerizing ethylene or a copolymer of ethylene and a $C_3$ to $C_{12}$ alpha olefin, a least partially in suspension, in the presence of said porous metal oxide support and at least one alkylaluminum compound until a degree of prepolymerization is reached which is suitable for the subsequent gas-phase of fluidized bed polymerization, and the method of polymerizing olefins utilizing the catalysts formed by the prepolymerization.

7 Claims, No Drawings

METHOD FOR THE TREATMENT OF A CATALYTIC COMPONENT ON A POROUS METAL OXIDE SUPPORT FOR THE POLYMERIZATION OF OLEFINS IN THE GAS PHASE AND METHOD OF POLYMERIZING OLEFINS

This application is a division of application Ser. No. 07/429,017, filed Oct. 30, 1989, now U.S. Pat. No. 5,112,785, which in turn is a continuation of application Ser. No. 206,119, filed Jun. 13, 1988, now abandoned.

BACKGROUND OF THE INVENTION

The present invention relates to a method for the treatment of a catalytic component of the Ziegler type which is deposited on an inorganic support of the porous metal oxide type which preserves the catalyst's morphology and control over the morphology of the polymer resulting from gas-phase polymerization of ethylene or gas-phase copolymerization of ethylene and at least one alpha olefin containing 3 to 12 carbon atoms.

It is known to deposit catalytic components on a support based on a porous metal oxide and to prepolymerize ethylene in the presence of said catalytic components. These two methods are used to regulate the size of the system injected in a gas-phase polymerization reactor. However, their combination alone does not permit control of particle size, elimination of the formation of fine particles consisting of particles which broke off the growing polymer, or an improvement in the comonomer's effectiveness in reducing the density of the crystallinity ratio (comonomer efficiency).

There also exist high-pressure polymerization processes which are different from gas-phase polymerization processes. They consist of depositing a catalytic component on a porous metal support and in prepolymerizing an alpha olefin on this combination. This is the case for the technique described in EP 133,383, according to which, after deposition on a porous metal support, the catalytic component is prepolymerized in contact with a $C_4$ to $C_{18}$ alpha olefin in the presence of a noncomplexed alkylaluminum. Under these conditions, a catalyst is produced with an average granulometry of less than 7 microns. This is difficult to isolate since the size is too fine. It is completely unsuited for gas-phase polymerization in which, by contrast, a catalyst must be used with as few fine particles as possible.

According to French Patent 2, , , 566 782 a catalytic component without support based on a porous metal oxide is used directly in fluidized polymerization and entails risks of point heat peaks which can lead to the formation of agglomerates, to the setting of masses, and, in some instances, to the breaking up of the catalyst with loss of morphology and formation of fine particles Which are always dangerous in a fluidized bed.

To correct these disadvantages, the catalytic component can be combined with a resistant granular support such as alumina, silica, manganese, or aluminum silicate. However, as specified in French Patent 2,566,782, the granular support increases the activity of the catalytic system with the consequences mentioned above. To avoid these consequences, the amount of support is increased, leading to a relatively high amount of inorganic residue in the final polymer.

The catalytic component without a support based on porous metal oxide can also be converted into a prepolymer. But, as in the preceding case, a decrease in the activity of the component requires an increase in the amount of prepolymer. According to French Patent 2,566,782, this reduces the economic advantage of the gas-phase polymerization process by complicating the prepolymerization phase due to the increase in the amount of solvent to be retreated and the need for large storage installations.

To avoid these disadvantages, the recommendation is made in French Patent 2,566,782 to use hydrogen for the treatment of the catalytic component, which is in the form of the prepolymer or a deposit on a support based on a porous metal oxide in the presence of a cocatalyst before using the catalytic component for polymerization in fluidized bed, also called gas-phase polymerization. This technique presents the disadvantage of deactivating the catalytic systems or the prepolymers and consequently results in a loss in productivity.

This technique, which consists of prepolymerizing ethylene in the presence of a catalytic component deposited on a porous metal oxide support in the presence of only alkylaluminum, is used again in EP 174,104. This document confirms that during prepolymerization particles break off, and under the described conditions it is impossible to preserve the morphology of the catalytic component in the prepolymer, and thus in the final polymer, when the active prepolymer is used for the polymerization of ethylene. According to the technique of EP 17.4,104, it is explicitly stated that the prepolymerized component is a powder with a particle size smaller than that of the nonprepolymerized component.

SUMMARY OF THE INVENTION

According to this invention, the treatment process for the catalytic component is characterized in that, after impregnation of its various constituents on a support based on a porous metal oxide, the prepolymerization of ethylene, at least part of which is suspended, is carried out in the presence of a cocatalyst selected from alkylaluminums complexed by an electron donor to achieve a prepolymerization degree suitable for the fluidized-bed and gas-phase polymerization method which will eventually be applied to the prepolymer.

The method consists in prepolymerizing the ethylene, to a limited prepolymerization degree, in the presence of a catalytic component comprising at least titanium, magnesium, and chlorine deposited on a support based on a porous metal oxide. The resulting active prepolymer, in association with a cocatalyst, which also serves to maintain the morphology, constitutes a catalyst for the polymerization of olefins which eliminates separation of particles from growing polymers and, thus, the formation of small particles. Another advantage of the method is that it permits the synthesis of prepolymers to a limited prepolymerization degree, thus allowing to support the integrity of the cocatalyst.

The degree of prepolymerization is preferably higher than 1.1 and such that the resulting prepolymer represents at most 1 wt.% of the final polymer.

DETAILED DESCRIPTION

The "degree of prepolymerization" is defined as the weight of the prepolymer, including the weight of the catalyst, divided by the weight of the combination of the catalytic component and its porous metal oxide support used to produce the prepolymer composition in question.

As a consequence of the porous nature of the catalyst and its support, it is possible to integrate the entire cocatalyst, even at low degrees of prepolymerization, Preferably, the degrees of prepolymerization are between 5 and 20 g of polyethylene per gram of component supported by the porous metal oxide.

The initial catalytic component for the polymerization of ethylene or the copolymerization of ethylene and at least one alpha olefin containing 3 to 12 carbons is produced according to any known method by the combination of at least one titanium compound, one magnesium compound, one halogen, and, possibly, one electron donor or acceptor and any other compound which can be used in this type of catalyst impregnated in a porous metal oxide support.

The titanium compound is selected from compounds with the formula $Ti(OR)_xCl_{4-x}$, with x being a number between 0 and 4, and R an aliphatic or aromatic $C_1$ to $C_{14}$ hydrocarbon radical, or $COR'$ with $R'$ being an aliphatic or aromatic $C_1$ to $C_{14}$ hydrocarbon radical.

The magnesium compound is usually selected from compounds with the formula $Mg(OR)_nX_{2-n}$ in which X is bromine, iodine, and, in particular, chlorine; R is a hydrogen or an alkyl or cycloalkyl radical; and n is less than or equal to 2.

An organoaluminum compound, selected more specifically from the aluminoxanes, can be combined with the magnesium compound.

The electron donor or receptor is a liquid or solid organic compound which is a known component of such catalysts. The electron donor can be a mono- or polyfunctional compound advantageously selected from aliphatic or aromatic carboxylic acids and their alkyl esters, aliphatic or cyclic ethers, ketones, vinyl esters, acrylic derivatives, in particular, alkyl acrylates or methacrylates and silanes. Notably suitable electron donors are compounds such as methyl paratoluate, ethylbenzoate, ethylacetate, or butylacetate, ethyl ether, ethylpara-anisate, dibutylphthalate, dioctylphthalate, diisobutylphthalate, tetrahydrofuran, dioxane, acetone, methylisobutylacetone, vinyl acetate, methyl methacrylate, and silanes, saturated or unsaturated aromatic or aliphatic alkoxysilanes such as phenyltriethoxysilane, diphenyldimethoxysilane, vinyltriethoxysilane, or tetraethoxysilane.

The electron acceptor is a Lewis acid, preferably selected from aluminum chlorides, boron trifluoride, chloranile, or again from alkylaluminums and alkylmagnesiums.

The porous metal oxide support comprises, in particular, compounds selected from $SiO_2$, $Al_2O_3$, $TiO_2$, $ZrO_2$, and mixed oxides containing $SiO_2$ and one or several metal oxides selected from $ZrO_2$, $TiO_2$, MgO, and $Al_2O_3$. Particularly suitable supports are particulate amorphous silicas, characterized by a pore volume from 1.5 to 3 $cm^3/g$, specific surfaces from 250 to 350 $m^2/g$ and an average pore radius of approximately 90 to 150 angstroms. These silicas can have an angular granular morphology or again a spheroid morphology.

Before being used as catalyst support, the metal oxide can be subjected to a thermal treatment and/or a chemical surface treatment to eliminate any traces of water and possibly to activate it.

The heat treatment can consist of exposing the metal oxide support for several hours to temperatures of 150° to 800° C. in a fluidized bed in a flow or inert gas.

After having eliminated the physically absorbed water by treatment at approximately 300° C. in a fluidized bed with a flow of dry inert gas for several hours, the chemical treatment of the support can consist of treating the support with a chemical reagent selected from alcohols, silanes, silazanes, mineral or organic chlorinating agents, organic chlorides of carboxylic acid, and aluminum alkyls.

The impregnation of the catalytic component composition in the porous metal oxide can be carried out according to any possible combination. This operation can, for example, be carried out as follows: the elements of the catalytic component can be first transformed into complexes by dissolution in a solubilizing electron donor, selected preferably from esters of carboxylic acids, aliphatic or cyclic oxide ethers and alcohols and the dissolved complex can be precipitated onto the support by the addition, for example, of a nonsolvent or by the elimination of the solvent used for the dissolution. After drying, the complex supported by the porous metal oxide can be resuspended in liquid hydrocarbon, such as n-hexane and, optionally, at this stage, activated by a cocatalyst. The catalytic component attached to this support is then recovered and dried.

A preferred method of impregnation consists in impregnating the porous metal oxide support with a liquid precursor consisting of alkylmagnesium or a mixture of alkylmagnesium and alkylaluminum. Then, after treatment with a chlorinating agent, such as, for example, HCl, the support treated in this manner is impregnated with the titanium compound.

The catalytic component which impregnates the support normally consists of a titanium compound and a magnesium compound with 0.5 to 10 weight parts of magnesium and 0.1 to 10 weight parts of titanium per 100 weight parts of porous metal oxide.

The catalytic component deposited on the porous metal oxide support is then converted to its final form by being made to participate in the prepolymerization of at least partially suspended ethylene in the presence of a complexed alkylaluminum with an electron donor as cocatalyst.

According to a preferred mode of prepolymerization in suspension, in an agitated mode of operation with stirring, the ethylene is prepolymerized, preferably in the presence of a chain limiter and in the presence of a cocatalyst selected from alkylaluminums known for this application and complexed by an electron donor, between 0° and 110° C., preferably between 20° and 60° C., and at a total pressure less than 20 absolute oars, produced essentially by an inert gas such as nitrogen. To preserve, as much as possible, the initial morphology of the catalytic component and its support, controlling the monomer feed rate to the reactor is recommended. The control of particle morphology in a growing prepolymer is particularly delicate with catalysts on a porous metal oxide support with a spheroidal shape. The tensions developed during the synthesis process for these supports is easily released as a result of prepolymerization, thus risking fragmentation of the spheroids. This fragmentation can be avoided during prepolymerization by maintaining the feed rate during the first hour of prepolymerization at a value less than or equal to 10 $NL \times h^{-1} \times g^{-1}$ of the catalytic component combination on the porous metal oxide support.

The monomer flow rate is then increased so that it remains less than or equal to $100NL \times h^{-1} \times g^{-1}$ of prepolymer present in the reactor at any instant.

Prepolymerization in suspension is continued until a degree of prepolymerization is achieved that is suitable for the subsequent polymerization process.

At any stage during prepolymerization, one can add to the components a morphology protector usually produced beforehand by reacting alkylaluminum with an electron donor. The morphology protector can be introduced in the prepolymerization reaction medium. It can also be advantageously added to the prepolymer after the prepolymerization, either directly into the reaction medium, or to the prepolymer stored in suspension under inert gas, The morphology protector allows not only the preservation of the morphology of the support and the catalytic component on the prepolymerized support, but also the imparting of this morphology to the final polymer. The use of the alkylaluminum electron-donor complex increases the effectiveness of the comonomer in reducing the density of the copolymer in the case of copolymerization.

In a possible mode of prepolymerization in suspension, in agitated operation with stirring, the prepolymerization is carried out under the conditions as described above until a limited degree of prepolymerization is reached, preferably less than 5 g of polymer per g of catalytic component supported by the porous metal oxide.

At this stage, the prepolymer is isolated, then inlet in a gas-phase prepolymerization system so as to pass from a low state of polymerization to a state of prepolymerization suitable for the subsequent polymerization process.

This part of the gas-phase prepolymerization is carried out under conditions typical for the polymerization of ethylene in the gaseous phase. One can, for example, combine in a reactor the prepolymer with a low degree of polymerization with a polyolefin charge having an average granulometry less than or equal to 3,000 and, preferably, less than or equal to 1,000 microns, preferably in the presence of a cocatalyst as defined above. After homogenization, prepolymerization is continued by introducing the monomer at a controlled flow rate so as to avoid rupture and formation of aggregates. Preferably the monomer is ethylene or a mixture of ethylene and butene. The prepolymerization in the gas phase is preferably carried out between 40° and 80° C. and under a total pressure, due to the monomer and to the inert gas, less than or equal to 20 bars.

This gas-phase prepolymerization is continued until a degree of prepolymerization is reached which is suitable for the subsequent polymerization process. However, it is recommended that this degree of prepolymerization is such that the resulting prepolymer represents at most 1 wt. % of the final polymer. To conserve the initial morphology of the catalytic component and its support as much as possible, controlling the monomer feed rate to the reactor is recommended. A suitable feed rate for the first hour is less than or equal to 10 $NL \times h^{-1} \times g^{-1}$ of the catalytic component on the porous metal oxide support.

The monomer flow rate can be increased so that it remains less than or equal to 100 $NL \times h^{-1} \times g^{-1}$ of prepolymer present in the reactor at any instant.

As shown for the preceding case, the prepolymerization can be carried out starting with ethylene, or ethylene and at least one alpha olefin with 3 to 12 carbons. Although under these conditions the alpha olefin can be introduced at any time during the prepolymerization, it is preferable to bring the catalytic component on the porous metal oxide support and the cocatalyst in contact with the alpha olefin, preferably by adding continuously, over approximately 30 minutes, a quantity by weight of alpha olefin representing preferably less than 50% of the catalytic component on the porous metal oxide support. This precontact is preferably carried out with an alpha olefin having 6 to 8 carbon atoms. The ethylene is then added in pure form or mixed to an alpha olefin having 3 to 12 carbon atoms. Under these conditions, the activity of the resulting active prepolymer is improved as is the morphology of the resulting polymer in the presence of this active prepolymer.

If an alpha olefin is combined with ethylene in the prepolymerization, the molar ratio of alpha olefin to ethylene is less than 0.1.

While the porous metal oxide support permits the control of the form and size of the catalytic component particles, prepolymerization permits preservation of this form and avoids the dissociation of these particles during the subsequent polymerization.

In the process according to the invention, the ratio of molar concentration of morphology protector, calculated as a ratio of aluminum to electron donor, is usually less than 40 and preferably between 25 and 10. This morphology protector is preferably used in a proportion of 500 to 100,000 ppm, calculated as aluminum with respect to component on the porous metal oxide support, in the prepolymer which as a degree of prepolymerization suitable for the subsequent polymerization process.

For the manufacture of the morphology protector, one can select the components from electron donors as defined above and conventionally known alkylaluminums as cocatalysts. These alkylaluminums are generally selected from compounds with formula $Al(R'')_c X'_d H_e$ in which:

$X'$ is Cl, or $R''$, representing a $C_1$ to $C_{14}$ saturated hydrocarbon radical with: $0 < d < 1.5$; $0 < e < 1$, and $c + d + e = 3$ As examples, one can cite: $Al(C_2H_5)_3$, $Al(C_2H_5)_2Cl$, $Al(C_4H_9)_3$, $Al_2(C_2H_5)_3Cl_3$, $Al(C_4H_9)_2H$, $Al(C_6H_{13})_3$, $Al(C_8H_{17})_3$, $Al(C_2H_5)_2H$, and $Al(C_2H_5)_2(OC_2H_5)$. Other compounds which can be cited are aluminoxanes and aluminosiloxanes.

The mixture of the alkylaluminum and the electron donor is carried out under an inert atmosphere using known means suitable for these types of components. When the liquid morphology protector is added to the prepolymer after prepolymerization, the operation is carried out under an inert atmosphere, either by admixing to the prepolymer in an inert liquid suspension or by impregnation of the prepolymer powder.

To the extent that a chain limiter is used in prepolymerization, hydrogen is preferably used. This chain limiter permits the control of the molecular weight of the prepolymer during prepolymerization.

The prepolymer obtained according to the invention is generally stored in dry form for later use as a polymerization catalyst in a fluidized bed or in the gas phase for the manufacture of a linear polyethylene powder with controlled morphology. This catalytic component, in the form of the prepolymer, maintains its morphology during polymerization, and it allows, as a result of this property, the production of linear polyethylenes which also have identical morphology.

In addition, since the prepolymer powder injected into the polymerization reactor is predominantly Organic, prepolymerization improves the homogeneity of the bed while at the same time increasing the particle sizes which limits entrainment out of the bed.

The catalytic component treated according to the invention is used as a classical (usual) component in a fluidized bed gas-phase polymerization processes for olefins. Although it can be used alone, the addition of a cocatalyst complement to the reaction medium to regulate productivity is not excluded. In this case, the cocatalyst can be a morphology protector and, preferably, it is identical to the one used for the manufacture of the prepolymer.

The polymerization of ethylene in the gas phase, in the presence of hydrogen and inert gas, can be carried out in any reactor which permits gas-phase polymerization and, in particular, in a stirred or fluidized bed reactor. The conditions of operation are known from the prior art. In general, the operational temperature is less than the fusion point (Tf) of the homopolymer or the copolymer to be synthesized and, in particular, between 20° C. and (Tf −5° C.) and under a pressure such that the ethylene and any other optional hydrocarbon monomers present in the reactor are essentially in the vapor phase.

The invention will be further described in connection with the following examples which are set forth for purposes of illustration only.

EXAMPLE 1 a) A granular silica (type 332 GRACE) is dried in a fluidized bed for 5 hours in a nitrogen flow at 200° C. In a 2-L reactor with vent, fitted with a filtration base, and purged with nitrogen, the following compounds are introduced: 22 g dry $SiO_2$, 200 cc dry hexane, 33 mM of hexamethyldisilazane. The medium is stirred for 1 hour at 55° C. and then filtered, washed with 200 cc hexane, and dried at 55° C. under nitrogen.

To this treated silica are added, under nitrogen and with stirring, a mixture of 92 mM of n-butyl-(1-methylpropyl) magnesium (DBM) and 23 mM of tetraisobutylaluminoxane (TIBAO). The suspended mixture is stirred for 1 hour at 55° C., then filtered. After resuspending in 200 cc of hexane at 25° C., 1.1 mol of HCl are bubbled through the mixture. The suspension is then heated to 55° C., and 60 mM of $TiCl_4$ are added with stirring for 1 hour. After filtration, the catalytic component on the porous metal oxide support is washed twice with 200 cc of hexane, dried under nitrogen at 55° C. and recovered still under nitrogen.

b) To the above reactor, the following compounds are added at 50° C. under nitrogen and with agitation at 150 rpm: 125 cc hexane, 4 mM of trihexylaluminum (THA) in the form of the THA-PTES (phenyltriethoxysilane) complex in a molar ratio of 30, and 4.6 g of the catalytic component on the above-mentioned porous metal oxide support. Next, with bubbling and at a controlled flow rate, ethylene is introduced under the following conditions:

4.5 NL/h for 1 hour, and
then 9.5 NL/h for 5 hours.

Once the introduction of the ethylene is completed, the solvent is eliminated by entrainment at 60° C. under nitrogen and 25.3 g of the catalytic component on the porous metal oxide support are recovered in the form of a dry prepolymer and stored under nitrogen. The degree of prepolymerization is equal to 5.5 g of prepolymer per gram of catalytic component on the porous metal oxide support.

EXAMPLE 2

In the reactor of Example 1, the following compounds are introduced at 50° C. under nitrogen and with stirring at 150 rpm: 125 cc dry hexane, 4 mM of THA in the form of the THA-PTES complex in a molar ratio of 30, and 4.6 g of the catalytic component on the porous metal oxide support of Example 1. In 30.minutes 0.25 cc of 1-hexene dissolved in 20 cc hexane are introduced. Then 4.5 NL/h of ethylene are added over a period of 1 hour, next 9.5 NL/h of ethylene over a period of 5 hours.

Once the introduction of the ethylene is completed, the solvent is eliminated under nitrogen at 60° C., and 32.2 g of the catalytic component on the porous metal oxide support are recovered in the form of a dry prepolymer and stored under nitrogen. The degree of prepolymerization is equal to 7.0 g of prepolymer per gram of catalytic component.

EXAMPLE 3

The conditions of Example 2 are repeated with 4.6 g of the catalytic component and, instead of 1-hexene, 0.25 cc of 4-methylpentene-1 dissolved in 20 cc hexane. 27.1 g of the catalytic component in the form of the prepolymer are recovered and stored under nitrogen. The degree of prepolymerization is equal to 5.9 g of prepolymer per gram of catalytic component.

EXAMPLE 4

The conditions of Example 2 are repeated with 4.6 g of the catalytic component on a porous metal oxide support, and the 1-hexene is replaced by 0.25 cc of 1-octene dissolved in 20 cc of hexane. 39.5 g of the catalytic component in the form of the prepolymer are recovered and stored under nitrogen. The degree of prepolymerization is equal to 8.6 g of prepolymer per gram of the catalytic component.

EXAMPLE 5

Under the conditions of Example 1a) a catalytic component is prepared on a microspheroid silica (type 955 W Grace).

In an 8.2-L reactor which was dried, rinsed with nitrogen, and maintained at 40° C., the following compounds are introduced successively with agitation at 300 rpm: 3 L of hexane, 26 mM of THA in the form of the THA-PTES complex in a molar ratio of 25, 20 g of the above-mentioned catalytic component, 3 bars of nitrogen, and 0.5 bars of hydrogen. Then, the ethylene is introduced at a controlled flow rate and under the following conditions:

5 NL/h for 1 hour,
10 NL/h for 30 minutes,
20 NL/h for 30 minutes,
40 NL/h for 30 minutes,
80 NL/h for 30 minutes, and
165 NL/h for 1 hour 30 minutes.

Once the introduction of the monomer is completed, the solvent is eliminated at 60° C. by entrainment with nitrogen. 340 g of the prepolymer are collected. The degree of prepolymerization is 17 g of prepolymer per gram of catalytic component on the microspheroid silica support.

EXAMPLE 6

Example 5 is repeated with the introduction over a period of 30 minutes, prior to the introduction of the hydrogen, of 5 g of 4-methylpentene-1 dissolved in 50 cc hexane. 378 g of the prepolymer are collected. The degree of prepolymerization is 18.9 g of prepolymer per gram of catalytic component on the microspheroid silica support.

EXAMPLE 7 a) In a 2-L reactor with vent, fitted with a stirrer and a double mantle, and purged with nitrogen, the following compounds are introduced: 167 mM of n-butyl(1-methylpropyl)magnesium (DBM) dissolved in hexane at a concentration of 0.76 M/L, 2 mM of tetraisobutylaluminoxane (TIBAO) dissolved in hexane at a concentration of 0.45 M/L.

The mixture is stirred for one hour at 55° C.

The mixture is then cooled to 25° C., and 1.4 mol of HCl are bubbled through it in 1 hour. The HCl in the resulting suspension is degassed by bubbling nitrogen. The suspension is then heated to 55° C., and 104 mM of $TiCl_4$ are added with stirring maintained for 1 hour.

The suspension is then transferred by siphoning into a reactor with a filtration base and purged with nitrogen. After the filtration, the catalytic component is washed twice with 200 cc of hexane, then dried by evaporation with nitrogen at 55° C. 15.5 g of the catalytic component are recovered.

b) In an 8.2-L reactor which was first dried purged with nitrogen, and maintained at 40° C. the following compounds are introduced successively with agitation at 300 rpm: 3 L of hexane, 13.6 mM of pure THA, 4 g of the above-mentioned catalytic component, 3 bars of nitrogen, and 0.5 bars of hydrogen. The ethylene is then introduced at a controlled flow rate under the following conditions:

5 NL/h for 1 hour,
10 NL/h for 30 minutes,
20 NL/h for 30 minutes,
40 NL/h for 30 minutes,
80 NL/h for 30 minutes, and
165 NL/h for 1 hour 40 minutes.

Once the introduction of the monomer is completed, the solvent is eliminated at 60° C. by entrainment with nitrogen. 423 g of the prepolymer are collected. The degree of prepolymerization is 308 g of prepolymer per gram of catalytic component.

EXAMPLE 8

Using the prepolymers of Examples 1 to 6, a gas-phase ethylene-butene copolymerization in a stirred bed is carried out.

The operation is carried out in an 8.2-L reactor which has been dried in the presence of 10 g of polyethylene powder as the dispersing charge. Into this reactor, which is maintained at 85° C. during the polymerization, 1-butene is injected with stirring at 400 rpm in a vacuum of 1.33 Pa at a pressure of 1 absolute bar. The injection of 1-butene is completed when the pressure reaches 2 absolute bars. Next 1 bar of hydrogen and 9 bars of ethylene are added successively to the reactor until the respective partial pressures of the hydrogen and the ethylene are 1 and 9 bars. After these injections, the active prepolymer which contains the catalytic component is introduced with nitrogen as a propellant, with the injection of nitrogen being continued until the total pressure inside the reactor is 21 bars. The pressure is maintained at this value in the reactor by injecting a mixture of 1-butene/ethylene in a molar ratio of 0.0466. After 3 hours of reaction, the polymerization is stopped by lowering the pressure in the reactor. Rinsing is carried out with nitrogen and the apparatus is allowed to cool.

For comparison, the same polymerization is carried out using the catalytic components of Examples 1 and 5 which were not subjected to the prepolymerization treatment and the same catalytic component non silica supported and prepolymerized as described in Example 7. When the catalytic component has not been subjected to the prepolymerization treatment, 1.2 mM of THA are added as a cocatalyst after the first injection of butene. Since these are prepolymers, the cocatalyst has already been introduced into the component and is concentrated on the prepolymer during its preparation.

The amounts of reactants and the analytical results are listed in Table I.

EXAMPLE 9

Using the apparatus of Example 7 and the same conditions of temperature and stirring, ethylene is added in a 1.33 Pa vacuum until the pressure reaches 9 bars. Next, 4 bars of hydrogen are added, then 2 g of the prepolymer of Example 6 with 8 bars of nitrogen. A constant pressure of 21 absolute bars is maintained by adding ethylene. The reaction is stopped after three hours by cooling and lower the pressure, and the polymer is collected.

The characteristics of the polymer are as follows:

| | |
|---|---|
| Yield: | 3,440 g of polyethylene per gram of catalytic component on the silica support |
| Average diameter of the particles: | 922μ |
| Apparent density: | 0.399 cm³/g |
| % of particles <200 microns | 1.8 |
| Morphology | spheroidal |
| Density | 0.958 |

TABLE I

| | | | | Polymerization of the 1-butene/ethylene mixture | | | | | |
|---|---|---|---|---|---|---|---|---|---|
| Catalytlic component | Amount of prepolymer in g | Cocatalyst | Al/ED** in mol | Yield*** | Dp 50**** | % particles <200μ | Morphology***** | Density g/cm³ | $C_2H_5$****** | Flow-ability in seconds |
| Example 1b) | 1.0 | THA-PTES | 30 | 6,900 | 824 | 1.0 | G | 0.919 | 19.1 | 26 |
| Example 1a) Comparative (component on SiO₂ without prepolymernation) | *0.15 | THA | — | 5,300 | 475 | 9.0 | G | 0.921 | 25.2 | 34 |
| Example 7b) Comparative | 3 | THA | — | 17,530 | 350 | 25 | G | 0.922 | 18.8 | No flow-ability |

TABLE I-continued

| | | | Polymerization of the 1-butene/ethylene mixture | | | | | | |
|---|---|---|---|---|---|---|---|---|---|
| Catalytlic component | Amount of prepolymer in g | Cocatalyst | Al/ED** in mol | Yield*** | Dp 50**** | % particles <200μ | Morphology***** | Density g/cm³ | $C_2H_5$****** | Flowability in seconds |
| (component without SiO$_2$ with prepolymernation) | | | | | | | | | | |
| Example 2 | 1.0 | THA-PTES | 30 | 6,620 | 958 | 1.8 | G | 0.920 | 18.1 | 31 |
| Example 3 | 1.0 | THA-PTES | 30 | 7,000 | 820 | 3.0 | G | 0.918 | 17 | 26 |
| Example 4 | 1.0 | THA-PTES | 30 | 9,900 | 1,033 | 0.5 | G | 0.918 | 20 | 26 |
| Example 5 | 2.0 | THA-PTES | 25 | 6,630 | 775 | 5.0 | S | 0.918 | 18.8 | 22 |
| Example 5 Comparative (component on SiO$_2$ without prepolymerization) | *0.15 | THA | — | 5,300 | 533 | 20.0 | G | 0.925 | 17.6 | 51 |
| Example 5 Comparative (component on SiO$_2$ and prepolymerization) | 2.0 | THA | — | 7,018 | 730 | 9.0 | G | 0.924 | 19.7 | 33 |
| Example 6 | 2.0 | THA-PTES | 25 | 7,600 | 837 | 3.0 | S | 0.919 | 17.6 | 24 |

*Active component on an SiO$_2$ support
**ED = electron donor
***Yield in grams of polyethylene per gram of catalytic component supported on silica or without silica for Example 7
****Dp50, average diameter of the particles at 50% of the cumulative curve
*****G = angular granular morphology, S = spheroidal morphology
******C$_2$H$_5$ = number of ethyl branch per 1,000 carbons While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A method for the manufacture of a homopolymer of ethylene or a copolymer of ethylene and a $C_3$ to $C_{12}$ alpha olefin comprising carrying out the polymerization in the gas-phase in the presence of a morphology protected granular catalyst prepared by first forming a granular catalytic component by impregnating a porous metal oxide support with at least one titanium compound, magnesium compound, and chloride compound, and prepolymerizing ethylene or a monomer mixture of ethylene and least one $C_3$ to $C_{12}$ alpha olefin, at least partially in suspension, in the presence of said impregnated porous metal oxide support and least one alkylaluminum compound, of the formula $Al(R'')_c X^1_d H_e$ in which $X^1$ is Cl or R", R" is a $C_1$ to $C_{14}$ unsaturated hydrocarbon radical, with $o<d<1.5$, $o<3<1$, and $c+d+e=3$, complexed with at least one electron donor, the monomer or monomer mixture being introduced into the reaction during the first hour of prepolymeriztion at a flow rate equal to or less than 10 NL $h^{-1} \times g^{-1}$ of catalytic component on the porous metal oxide support.

2. The method of claim 1, wherein the degree of prepolymerization is between 5 and 20 grams of polyethylene per gram of component supported by the porous metal oxide.

3. The method of claim 2 wherein the degree of prepolymerization is higher than 1.1 and such that the formed prepolymer represents at most 1 wt. % of the final polymer.

4. The method of claim 3, wherein after the first hour or prepolymerization the flow rate is increased to less than or equal to 100 $NL \times h^{-1} \times g^{-1}$ of prepolymer present at any instant.

5. The method of claim 4, wherein in the case of prepolymerization in the presence of ethylene and an alpha olefin, the prepolymerization is started in the presence of alpha olefin alone, and then continued with ethylene alone, or in the presence of a mixture of ethylene and an alpha olefin.

6. The method of claim 5, wherein prior to the prepolymerization, the porous metal oxide support is impregnated with an alkylmagnesium alone, or mixed with an alkylaluminum, then after treatment with a chlorination agent, the support is impregnated with the titanium compound.

7. The method of claim 6, wherein at the latest after prepolymerization the product of the reaction of an alkyaluminum compound and an electron donor is added to the catalytic component to maintain the morphology of the catalytic component during polymerization.

* * * * *